(12) United States Patent
Wilson (10) Patent No.: US 11,007,939 B1
(45) Date of Patent: May 18, 2021

(54) SUPPORT ASSEMBLY FOR MIRROR

(71) Applicant: MOTHERSON INNOVATIONS COMPANY LIMITED, London (GB)

(72) Inventor: Douglas James Wilson, Fort Gratiot, MI (US)

(73) Assignee: Motherson Innovations Company Limited, London (GB)

( * ) Notice: Subject to any disclaimer, the term of this patent is extended or adjusted under 35 U.S.C. 154(b) by 2 days.

(21) Appl. No.: 16/722,080

(22) Filed: Dec. 20, 2019

(51) Int. Cl.
  *B60R 1/078* (2006.01)
  *B60R 1/00* (2006.01)
  *F16M 13/02* (2006.01)
  *B60R 1/02* (2006.01)

(52) U.S. Cl.
  CPC .............. *B60R 1/006* (2013.01); *B60R 1/025* (2013.01); *B60R 1/078* (2013.01); *F16M 13/022* (2013.01)

(58) Field of Classification Search
  CPC ........ F16M 13/022; B60R 1/078; B60R 1/025
  See application file for complete search history.

(56) References Cited

U.S. PATENT DOCUMENTS

| | | | | |
|---|---|---|---|---|
| 4,998,812 A | * | 3/1991 | Hou | B60R 1/078 248/478 |
| 6,325,518 B1 | * | 12/2001 | Whitehead | B60R 1/078 248/478 |
| 6,672,726 B1 | * | 1/2004 | Boddy | B60R 1/078 359/841 |
| 6,820,987 B1 | * | 11/2004 | Lewis | B60Q 1/2665 359/850 |
| 6,851,813 B2 | * | 2/2005 | Vandenbrink | B60R 1/078 359/841 |
| 7,350,931 B1 | | 4/2008 | Peterson et al. | |
| 7,441,910 B1 | * | 10/2008 | Peterson | B60R 1/078 359/841 |
| 7,490,946 B1 | * | 2/2009 | Foote | B60R 1/06 248/478 |
| 7,594,731 B2 | * | 9/2009 | Sinelli | B60R 1/025 248/479 |
| 2019/0291644 A1 | * | 9/2019 | Miles | B60R 1/078 |

* cited by examiner

*Primary Examiner* — Bradley Duckworth
(74) *Attorney, Agent, or Firm* — Jones Day (57) ABSTRACT

A support assembly for a mirror head includes a support arm defining a longitudinal axis. A top slot wall and a bottom slot wall of the support arm extend at least partly along the longitudinal axis and at least partly define a slot therebetween. The top slot wall defines an opening therethrough. A ramp extends from the bottom slot wall towards the top slot wall adjacent to the opening. The support assembly further includes inboard and outboard trunnions that are adapted to be at least partly and movably received in the slot. A carriage is coupled to the outboard trunnion and the mirror head. A support brace is rotationally coupled to the inboard and outboard trunnions. The outboard trunnion selectively travels on the ramp and through the opening to allow the support brace to be inclined obliquely relative to the longitudinal axis and the carriage to be rotated.

20 Claims, 6 Drawing Sheets

SUPPORT ASSEMBLY FOR MIRROR

TECHNICAL FIELD

The present disclosure relates generally to a mirror system, and more specifically to a support assembly for a mirror system.

BACKGROUND

Vehicles typically include one or more external rearview mirrors. Such external rearview mirrors are generally adapted to be adjusted at preselected positions. For example, external rearview mirrors can be selectively folded towards and away from the vehicle. Further, such external rearview mirrors can also be rotated between a landscape position and a portrait position for adjusting a field of view.

In order to switch between the landscape and portrait positions, conventional mirror heads are rotated about a single pivot which is perpendicular to the mirror. The pivot is generally placed at an outboard end of a support arm that supports the mirror head. The position of the pivot may place a relatively large mass (i.e., the mirror head) at the outboard end of a long cantilevered arm (i.e., the support arm). This may cause the mirror's center of gravity to reside in an unfavourable position leading to undesirable vibrations of the mirror head. Such vibrations may increase when the mirror head is rotated to the portrait position as the center of gravity is moved further outboard of the vehicle.

SUMMARY OF THE DISCLOSURE

In one aspect, the present disclosure provides a support assembly for a mirror head. The support assembly includes a support arm defining an inboard end, an outboard end opposite to the inboard end, and a longitudinal axis extending between the inboard end and the outboard end. The support arm includes a top slot wall at least partly extending along the longitudinal axis. The top slot wall defines an opening therethrough between the inboard end and the outboard end. The support arm further includes a bottom slot wall disposed opposite to the top slot wall and at least partly extending along the longitudinal axis. The top slot wall and the bottom slot wall at least partly define a slot therebetween. The support arm further includes a ramp extending from the bottom slot wall towards the top slot wall adjacent to the opening. The ramp is inclined obliquely relative to the longitudinal axis. The support assembly further includes an inboard trunnion adapted to be at least partly and movably received in the slot. The support assembly further includes an outboard trunnion adapted to be at least partly and movably received in the slot. The support assembly further includes a carriage coupled to the outboard trunnion and the mirror head. The carriage is selectively rotatable. The support assembly further includes a support brace rotationally coupled to the inboard trunnion and the outboard trunnion such that the support brace is rotatable relative to the inboard trunnion and the outboard trunnion. The outboard trunnion selectively travels on the ramp and through the opening to allow the support brace to be inclined obliquely relative to the longitudinal axis and the carriage to be rotated.

In an example, the carriage may be selectively rotatable between a landscape orientation and a portrait orientation. In the landscape orientation, the carriage may be orientated substantially parallel to the longitudinal axis. In the portrait orientation, the carriage may be orientated substantially perpendicular to the longitudinal axis.

In an example, in a home position of the support assembly, the inboard trunnion may be at least partly received in the slot and disposed inboard of the ramp and the opening. The outboard trunnion may be at least partly received in the slot and disposed inboard of the ramp and the opening. The support brace may be disposed substantially parallel to the longitudinal axis and proximal to the inboard end of the support arm. The carriage may be in the landscape orientation.

In an example, in an extended position of the support assembly, the inboard trunnion may be at least partly received in the slot and disposed inboard of the ramp and the opening. The outboard trunnion may be at least partly received in the slot and disposed proximal to the ramp. The support brace may be disposed substantially parallel to the longitudinal axis and spaced apart from the inboard end of the support arm. A distance between the support brace and the inboard end in the extended position may be greater than a distance between the support brace and the inboard end in the home position. The carriage may be in the landscape orientation.

In an example, in a rotated position of the support assembly, the inboard trunnion may be at least partly received in the slot and disposed proximal to the ramp. The outboard trunnion may be disposed outside the slot and outboard of the ramp and the opening. The support brace may be inclined obliquely to the longitudinal axis. The carriage may be in the portrait orientation.

In an example, the top slot wall may further include a top curved portion disposed proximal to the outboard end. The bottom slot wall may further include a bottom curved portion disposed proximal to the outboard end. The top curved portion and the bottom curved portion may at least partly define a curved portion of the slot therebetween.

In an example, the top slot wall may further include a top vertical portion disposed adjacent to the top curved portion and substantially perpendicular to the longitudinal axis. The bottom slot wall may further include a bottom vertical portion disposed adjacent to the bottom curved portion and substantially perpendicular to the longitudinal axis. The top vertical portion and the bottom vertical portion may at least partly define a vertical portion of the slot therebetween.

In an example, the support assembly may further include an end trunnion at least partly and movably received in the slot and disposed outboard of the ramp and the opening. The end trunnion may be coupled to the carriage. In the rotated position, the end trunnion may be at least partly received in the vertical portion of the slot.

In an example, the support assembly may further include an upper arm cover adapted to at least partly enclose the support arm and the support brace. The upper arm cover may be pivotable and spring-biased to allow the support brace to be inclined obliquely relative to the longitudinal axis.

In an example, the support assembly may further include a lower arm cover at least partly enclosing the support arm.

In an example, the support assembly may further include a plurality of detents disposed on at least one of the top slot wall and the bottom slot wall.

In an example, the support arm may further include a side slot wall extending between the top slot wall and the bottom slot wall. The top slot wall, the bottom slot wall and the side slot wall may together define the slot therebetween.

In an example, the support assembly may further include a base frame and a pivot mechanism coupled to the base frame. The support arm may be coupled to the pivot mechanism.

In an example, the support assembly further may include a motor drive adapted to selectively drive the carriage along the longitudinal axis.

In another aspect, the present disclosure provides a mirror system for a vehicle. The mirror system includes a base frame coupled to the vehicle, a pivot mechanism coupled to the base frame, and a support assembly. The support assembly includes a support arm coupled to the pivot mechanism and defining an inboard end, an outboard end opposite to the inboard end, and a longitudinal axis extending between the inboard end and the outboard end. The support arm includes a top slot wall extending at least partly along the longitudinal axis. The top slot wall defines an opening therethrough between the inboard end and the outboard end. The support arm further includes a bottom slot wall disposed opposite to the top slot wall and extending at least partly along the longitudinal axis. The top slot wall and the bottom slot wall at least partly define a slot therebetween. The support arm further includes a ramp extending from the bottom slot wall towards the top slot wall adjacent to the opening. The ramp is inclined obliquely relative to the longitudinal axis. The support assembly further includes an inboard trunnion adapted to be at least partly and movably received in the slot. The support assembly further includes an outboard trunnion adapted to be at least partly and movably received in the slot. The support assembly further includes a carriage coupled to the outboard trunnion. The carriage is selectively rotatable between a landscape orientation and a portrait orientation. In the landscape orientation, the carriage is orientated substantially parallel to the longitudinal axis. In the portrait orientation, the carriage is orientated substantially perpendicular to the longitudinal axis. The support assembly further includes a support brace rotationally coupled to the inboard trunnion and the outboard trunnion such that the support brace is rotatable relative to the inboard trunnion and the outboard trunnion. The mirror system further includes a mirror head fixedly coupled to the carriage. The outboard trunnion selectively travels on the ramp and through the opening to allow the support brace to be inclined obliquely relative to the longitudinal axis and the carriage to be rotated from the landscape to portrait orientation.

In an example, in a home position of the mirror system, the inboard trunnion may be at least partly received in the slot and disposed inboard of the ramp and the opening. The outboard trunnion may be at least partly received in the slot and disposed inboard of the ramp and the opening. The support brace may be disposed substantially parallel to the longitudinal axis and proximal to the inboard end of the support arm. The carriage may be in the landscape orientation.

In an example, in an extended position of the mirror system, the inboard trunnion may be at least partly received in the slot and disposed inboard of the ramp and the opening. The outboard trunnion may be at least partly received in the slot and disposed proximal to the ramp. The support brace may be disposed substantially parallel to the longitudinal axis and spaced apart from the inboard end of the support arm. A distance between the support brace and the inboard end in the extended position may be greater than a distance between the support brace and the inboard end in the home position. The carriage may be in the landscape orientation.

In an example, in a rotated position of the mirror system, the inboard trunnion may be at least partly received in the slot and disposed proximal to the ramp. The outboard trunnion may be disposed outside the slot and outboard of the ramp and the opening. The support brace may be inclined obliquely to the longitudinal axis. The carriage may be in the portrait orientation.

In an example, the mirror system may further include an end trunnion at least partly and movably received in the slot and disposed outboard of the ramp and the opening. The end trunnion may be coupled to the carriage.

In an example, the mirror system may further include a plurality of detents disposed on at least one of the top slot wall and the bottom slot wall.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the disclosure is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the disclosure. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

It is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity and are not intended to limit the scope of the disclosure or the appended claims. Further, it should be understood that any one of the features can be used separately or in combination with other features. Other systems, methods, features, and advantages of the disclosure will be or become apparent to one with skill in the art upon examination of the detailed description. It is intended that all such additional systems, methods, features, and advantages be included within this description, be within the scope of the present disclosure, and be protected by the accompanying claims.

The present disclosure relates to a support assembly for a mirror. The support assembly includes a support arm that defines a slot. The slot includes an opening spaced apart from an inboard end of the support arm. A ramp is disposed proximal to the opening. An inboard trunnion and an outboard trunnion are movably received in the slot. A support brace is rotationally coupled to the inboard and outboard trunnions. Further, a carriage is coupled to the outboard trunnion and a mirror head of the mirror. The support brace can slide along a longitudinal axis of the support arm due to movements of the inboard and outboard trunnions relative to the slot. The support brace may be retained substantially parallel to the longitudinal axis as along as the outboard trunnion is received in the slot. Further, the carriage may be prevented from rotating as long as the support brace is substantially parallel to the longitudinal axis. Upon actuation, the outboard trunnion can travel up the ramp and through the opening to allow the support brace to be inclined relative to the longitudinal axis and the carriage to be rotated. The support assembly may use a movable pivot associated with the support brace instead of a fixed single axis pivot at an end of a cantilevered arm. The support brace may be lightweight and compact, and therefore not adversely affect a natural frequency of a mirror system. The support assembly may allow further adjustment of the mirror head between three positions. For example, the support assembly may allow an additional extended position between an inboard home position and an outboard rotated position. Additionally, the support assembly may be simple and compact. The support assembly can be used with relatively smaller vehicles, such as pick-up trucks. For example, a mirror system including the support assembly may be used as a trailer towing mirror for smaller vehicles.

Figure 1A:
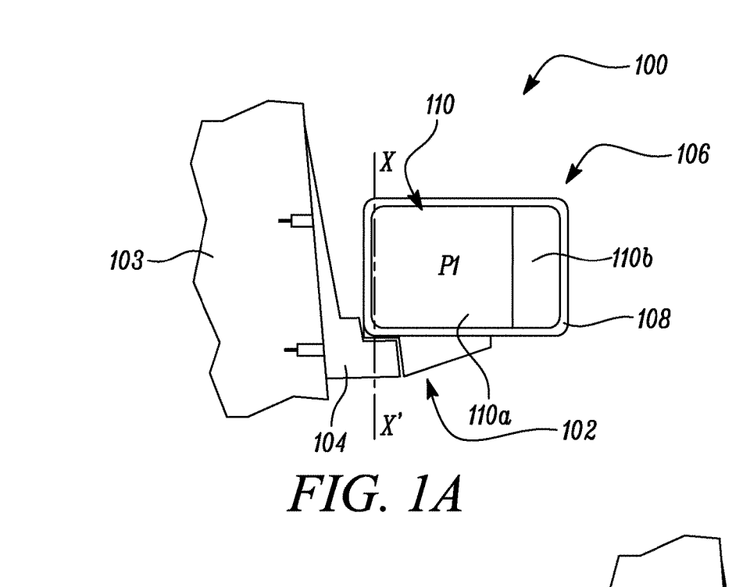
FIGS. 1A, 1B and 1C illustrate an example of a mirror system for a vehicle in three different positions.
Figure 1B:
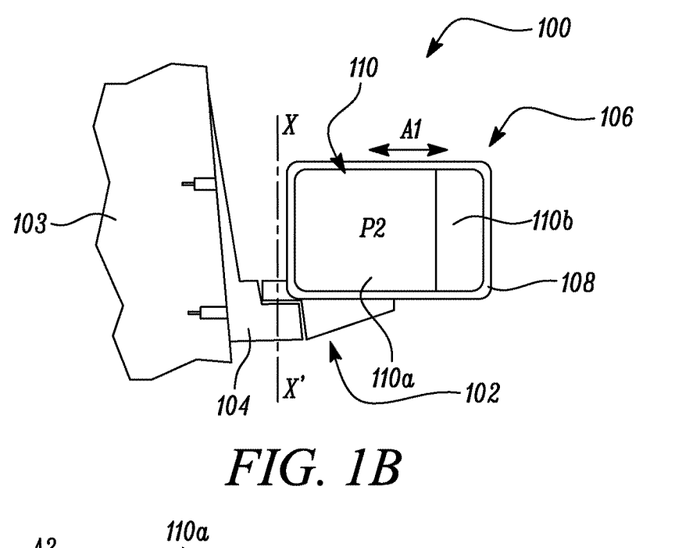
Figure 1C:
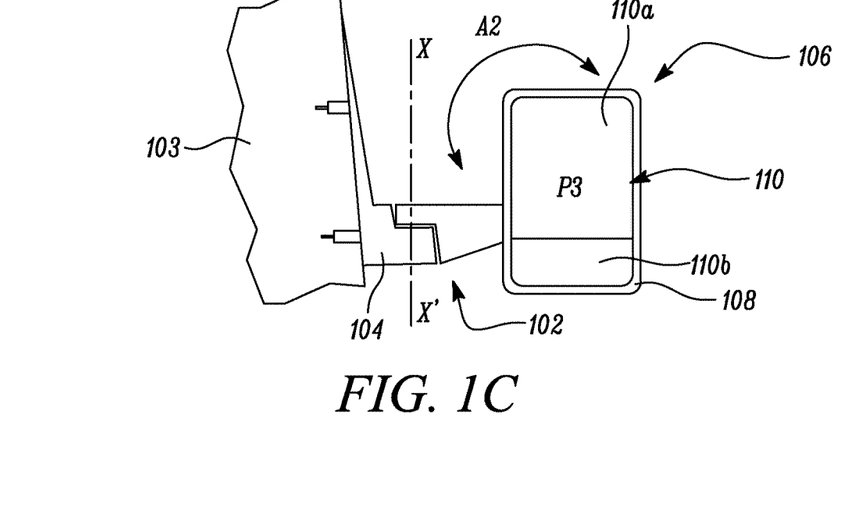

Referring now to the Figures, FIGS. 1A, 1B and 1C illustrate an example of a mirror system 100. The mirror system 100 includes a support assembly 102 coupled to a base frame 104 and a mirror head 106 coupled to the support assembly 102. The support assembly 102 adjustably supports the mirror head 106. The base frame 104 is coupled to a body 103, for example, via fasteners. The mirror head 106 is adapted to be pivoted about a rotational axis X-X'. In the illustrated example of FIGS. 1A-1C, the mirror head 106 has a substantially rectangular shape with rounded edges. However, in other examples, the mirror head 106 may have any suitable shape, such as circular, elliptical, oval, polygonal, etc. The mirror head 106 includes a mirror frame 108 which is adapted to receive a reflective element 110. The mirror frame 108 may be of any desired shape. Further, the reflective element 110 may have any suitable type, such as flat, concave, convex, or a combination thereof. The reflective element 110 includes a primary reflective element 110a and a secondary reflective element 110b. The secondary reflective element 110b may be a convex mirror. The secondary reflective element 110b may act as a blind spot mirror and may allow the mirror to reflect objects from a wider range of angles than is possible with the primary reflective element 110a.

The support assembly 102 enables the mirror head 106 to be adjustable longitudinally and rotatably relative to the base frame 104. The longitudinal adjustment is shown in FIG. 1B, while the rotational adjustment is shown in FIG. 1C. In some examples, the mirror head 106 can be adjustable manually and/or automatically.

Referring now to FIG. 1A, the mirror head 106 of the mirror system 100 is disposed in a home position P1. In the home position P1, the mirror head 106 may translate away from the base frame 104 by means of the support assembly 102. Further, the mirror system 100 is in a landscape orientation. In the landscape orientation, a longitudinal axis of the mirror head 106 is substantially perpendicular to the rotational axis X-X'. In some examples, the support assembly 102 prevents the mirror head 106 from rotating about its axis in the home position P1. Therefore, in the home position P1, the support assembly 102 retains the mirror head 106 in the landscape orientation.

FIG. 1B illustrates the mirror head 106 in an extended position P2 after translating away from the base frame 104 in the direction of an arrow A1. In the extended position P2, a distance between the mirror head 106 and the base frame 104 is greater than a distance in the home position P1. Specifically, the extended position P2 is outboard of the home position P1. The terms "inboard" and "outboard" are defined with respect to the base frame 104. Further, the mirror head 106 is in the landscape orientation. In the extended position P2, the mirror head 106 may provide a wider field of view as compared to a field of view in the home position P1. Further, the support assembly 102 may restrict the mirror head 106 from further translation away from the base frame 104.

FIG. 1C illustrates the mirror head 106 in a rotated position P3. In the rotated position P3, the mirror head 106 is in a portrait orientation. In the portrait orientation, the longitudinal axis of the mirror head 106 is substantially parallel to the rotational axis X-X'. The mirror head 106 reaches the rotated position P3 by rotation from the landscape orientation shown in FIG. 1B to the portrait orientation shown in FIG. 1C. The mirror head 106 rotates about its own axis from the landscape orientation to the portrait orientation as shown by an arrow A2. A field of view of the mirror head 106 in the portrait orientation may be further enhanced as compared to the field of view in the landscape orientation. The support assembly 102 may allow rotation of the mirror head 106 between the landscape orientation and the portrait orientation in the extended position P2.

Therefore, the mirror head 106 can be translated outboard from the home position P1 to the extended position P2 and then rotated about its axis to the rotated position P3. Further, the mirror head 106 can be rotated from the rotated position P3 back to the extended position P2, and then translated inboard to the home position P1.

In some examples, the mirror system 100 may be installed on a door or a cab of a vehicle (not shown). In some examples, the vehicle may be a small truck for towing a trailer. However, the mirror system 100 may also be used with other types of vehicles, for example, buses, trucks, off-road vehicles, motorcycles, aircrafts, bicycles, trams, locomotives, heavy-duty vehicles used in construction and earthworking, and so forth. In some examples, the body 103 may be coupled to or a part of the vehicle. In some examples, the mirror system 100 may be used as a trailer towing mirror for a vehicle, such as a pick-up truck.

In some examples, the mirror system 100 includes a side view mirror. The mirror system 100 may help a driver to view areas disposed behind and to the side of the vehicle. In some examples, the mirror system 100 may also be provided with additional functionality, such as an automatic dimming reflective element, a reflective element defogging/defrosting element, turn indicators, area lights, powered extension, power folding, spotlights, and the like.

Figures 2A, 2B, 2C:
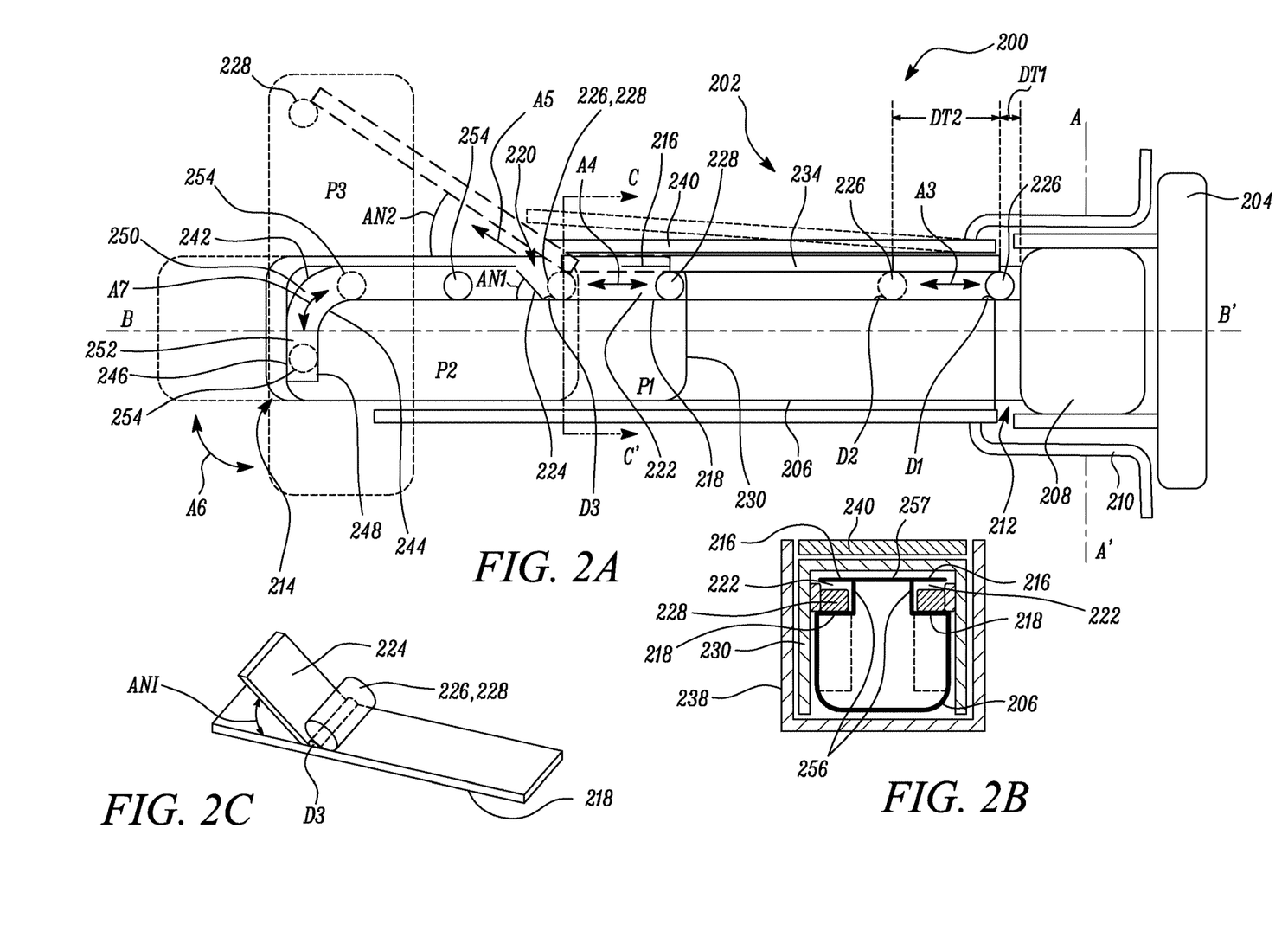
FIG. 2A illustrates a schematic side view of an example of a mirror system.
FIG. 2B illustrates a schematic sectional view of the mirror system taken along a line C-C' in FIG. 2A.
FIG. 2C illustrates a schematic perspective view of an example of a ramp of the mirror system of FIG. 2A.

FIG. 2A illustrates a mirror system 200 similar to the mirror system 100 described with reference to FIGS. 1A-1C. The mirror system 200 includes a support assembly 202 mounted on a base frame 204. The support assembly 202 includes a support arm 206 coupled to the base frame 204 through a pivot mechanism 208. In an example, the base frame 204 may be coupled to a body of a vehicle. The pivot mechanism 208 is coupled to the base frame 204. The pivot mechanism 208 allows pivotal movement of the mirror system 200 relative to the base frame 204 about a rotational axis A-A'. The pivot mechanism 208 is generally well-known, which can be either be manually adjusted or powered though a drive. In some cases, the pivot mechanism 208 may include a pin joint to allow the support assembly 202 to rotate about the rotational axis A-A' relative to the base frame 204. In the illustrated example, the pivot mechanism 208 is enclosed within a base cover 210. The base cover 210 defines an opening to allow the support arm 206 to extend outwardly from the base frame 204. The base cover 210 may be coupled to the support arm 206 and pivotable relative to the base frame 204. The base cover 210 may protect the pivot mechanism 208 from external elements.

The support arm 206 defines an inboard end 212 and an outboard end 214 opposite to the inboard end 212. The inboard end 212 is proximal to the base frame 204 and the pivot mechanism 208, while the outboard end 214 is distal to the base frame 204 and the pivot mechanism 208. Further, as used herein, an inboard side of a component is towards the inboard end 212 or the base frame 204, while an outboard side of the component is towards the outboard end 214 and opposite to the inboard end 212. As used herein, a first component is outboard of a second component if the first component is disposed on the outboard side of the second component. Conversely, the first component is inboard of the second component of the first component is disposed on the inboard side of the second component.

The support arm 206 further defines a longitudinal axis B-B' extending between the inboard end 212 and the outboard end 214 of the support arm 206. The support arm 206 includes a top slot wall 216 extending at least partly along the longitudinal axis B-B' of the support arm 206. The top slot wall 216 defines an opening 220 therethrough between the inboard end 212 and the outboard end 214 of the support arm 206. The support arm 206 further includes at least one bottom slot wall 218 disposed opposite to the top slot wall 216 and extends at least partly along the longitudinal axis B-B' of the support arm 206. The top slot wall 216 and the bottom slot wall 218 define a slot 222 therebetween. The support arm 206 further includes a ramp 224. The ramp 224 extends from the bottom slot wall 218 towards the top slot wall 216 adjacent to the opening 220. The ramp 224 is inclined obliquely relative to the longitudinal axis B-B' of the support arm 206. A top edge of the ramp 224 is closer to the outboard end 214 of the support arm 206 as compared to a bottom edge of the ramp 224. In other words, the ramp 224 extends towards the outboard end 214 from the bottom slot wall 218. The ramp 224 may be inclined at an angle AN1 relative to the longitudinal axis B-B'. In some examples, the angle AN1 is greater than zero degrees and less than 90 degrees.

The support assembly 202 further includes an inboard trunnion 226 adapted to be at least partly and movably received in the slot 222. The inboard trunnion 226 may be slidable and/or rotatable relative to the slot 222. The support assembly 202 further includes an outboard trunnion 228 adapted to be at least partly and movably received in the slot 222. The outboard trunnion 228 may be slidable and/or rotatable relative to the slot 222. In some cases, each of the inboard and the outboard trunnions 226, 228 may include a coating to facilitate movement relative to the slot 222.

In an example, the support arm 206 includes a pair of the top and bottom slot walls 216, 218. The pair of the top and bottom slot walls 216, 218 define a pair of the slots 222 therebetween. A connecting wall 257 may connect the pair of top slot walls 216. Further, the support arm 206 includes a pair of the inboard trunnions 226 and a pair of the outboard trunnions 228. The pair of the inboard trunnions 226 and the pair of outboard trunnions 228 are disposed in the corresponding slots 222 defined between the pair of the top and bottom slot walls 216, 218. The pair of the inboard trunnions 226 and the pair of the outboard trunnions 228 are provided on an inboard side of the ramp 224 with the pair of the inboard trunnions 226 being closer to the base frame 204. In some cases, the ramp 224 may include two sections (not shown) such that each section is disposed in the corresponding slots 222. However, the support arm 206 may include any number of slots 222 as per application requirements. A number of the inboard trunnions 226 and a number of the outboard trunnions 228 may vary accordingly.

The support assembly 202 further includes a carriage 230 coupled to the outboard trunnion 228 and a mirror head (not shown in FIG. 2A). The mirror head may be similar to the mirror head 106 shown in FIGS. 1A-1C. The carriage 230 is selectively rotatable. Further, the carriage 230 is fixedly coupled to the mirror head. The support assembly 202 further includes a support brace 234 rotationally coupled to the inboard trunnion 226 and the outboard trunnion 228 such that the support brace 234 is rotatable relative to the inboard trunnion 226 and the outboard trunnion 228. The support brace 234 may translate along with the inboard trunnion 226 and the outboard trunnion 228. The support brace 234 may be coupled to the inboard trunnion 226 and the outboard trunnion 228 by respective pivot joints.

FIG. 2B illustrates a cross-sectional view of the support arm 206 taken along a line C-C' in FIG. 2A. Referring to FIGS. 2A and 2B, the inboard trunnion 226 and the outboard trunnion 228 are received in the slot 222 enclosed by the top slot wall 216 and the bottom slot wall 218. In the illustrated example, the slot 222 has a substantially rectangular cross-section. However, in other examples, the slot 222 may have any given shape without limiting the scope of the present disclosure. Also, each of the inboard trunnion 226 and the outboard trunnion 228 has a substantially cylindrical shape. However, in other examples, each of the inboard trunnion 226 and the outboard trunnion 228 may have alternative shapes as per application requirements. The support assembly 202 further includes an upper arm cover 240 adapted to at least partly enclose the support arm 206 and the support brace 234. The upper arm cover 240 is pivotable and spring-biased to allow the support brace 234 to be inclined obliquely relative to the longitudinal axis B-B'. The upper arm cover 240 may be pivoted at the inboard end 212 of the support arm 206. The upper arm cover 240 may be coupled to and pivotable relative to the base cover 210. The upper arm cover 240 may pivot towards or away from the support arm 206. The support assembly 202 further includes a lower arm cover 238 at least partly enclosing the support arm 206. The lower arm cover 238 may be fixedly coupled to the base cover 210 at the inboard end 212 of the support arm 206. The upper and lower arm covers 240, 238 may provide protection to the support arm 206 and the mechanism enclosed therein from external elements. In the illustrated example, the upper arm cover 240 is substantially planar, while the lower arm cover 238 is substantially U-shaped. However, shapes of the upper and lower arm covers 240, 238 may be varied as per application requirements.

In the illustrated example, the carriage 230 is selectively rotatable between a landscape orientation and a portrait orientation. As used herein, a component is in a landscape orientation if its major axis is substantially parallel to the longitudinal axis B-B' of the support arm 206. Conversely, a component is in a portrait orientation if its major axis is substantially perpendicular to the longitudinal axis B-B' of the support arm 206. In the landscape orientation, the carriage 230 is orientated substantially parallel to the longitudinal axis B-B'. In the portrait orientation, the carriage 230 is oriented substantially perpendicular to the longitudinal axis B-B'.

The support brace 234 can be selectively moved between the inboard end 212 and the outboard end 214 of the support arm 206 along the longitudinal axis B-B' with the help of the inboard trunnion 226 and the outboard trunnion 228. The support brace 234 can also be selectively rotated relative to the support arm 206. The carriage 230 moves along with the support brace 234 due to the coupling of the carriage 230 with the outboard trunnion 228. The carriage 230 is further rotatable with respect to the outboard trunnion 228. The carriage 230 can be selectively moved between the home position P1, the extended position P2 and the rotated position P3. The outboard trunnion 228 selectively travels on the ramp 224 and through the opening 220 to allow the support brace 234 to be inclined obliquely relative to the longitudinal axis B-B' and the carriage 230 to be rotated.

FIG. 2C illustrates a perspective view of the ramp 224 extending from the bottom slot wall 218. In the illustrated example, the ramp 224 is substantially planar and is inclined at the angle AN1 relative to the bottom slot wall 218. The ramp 224 further extends towards the outboard end 214 (shown in FIG. 2A) of the support arm 206. In alternative examples, the ramp 224 may be curved. A width of the ramp 224 may be less than or equal to a width of the bottom slot wall 218.

Referring to FIGS. 2A-2C, in the home position P1, the inboard trunnion 226 is at least partly received in the slot 222 and disposed inboard of the ramp 224 and the opening 220 of the top slot wall 216 of the support arm 206. In the home position P1, the outboard trunnion 228 is at least partly received in the slot 222 and disposed inboard of the ramp 224 and the opening 220 of the top slot wall 216 of the support arm 206. In the home position P1, the support brace 234 is disposed substantially parallel to the longitudinal axis B-B' and proximal to the inboard end 212 of the support arm 206. Further, in the home position P1, the carriage 230 along with the mirror head is in the landscape orientation.

In the extended position P2, the inboard trunnion 226 is at least partly received in the slot 222 and disposed inboard of the ramp 224 and the opening 220 of the top slot wall 216. In the extended position P2, the outboard trunnion 228 is at least partly received in the slot 222 and disposed proximal to the ramp 224. The inboard trunnion 226 and the outboard trunnion 228 can be displaced along the longitudinal axis B-B', as shown by arrows A3 and A4, respectively. The support brace 234 is disposed substantially parallel to the longitudinal axis B-B' of the support arm 206 and spaced apart from the inboard end 212 of the support arm 206. A distance DT2 between the support brace 234 and the inboard end 212 in the extended position P2 is greater than a distance DT1 between the support brace 234 and the inboard end 212 in the home position P1. In the extended position P2, the carriage 230 along with the mirror head is in the landscape orientation. The carriage 230 reaches the extended position P2 from the home position P1 by translating outboard from the base frame 204 along with the outboard trunnion 228. The extended position P2 of the carriage 230 may provide a wider field of view of the surroundings as compared to the field of view in the home position P1.

In the rotated position P3, the inboard trunnion 226 is at least partly received in the slot 222 and disposed proximal to the ramp 224 of the support arm 206. In the rotated position P3, the outboard trunnion 228 is disposed outside the slot 222 and outboard of the ramp 224 and the opening 220 of the top slot wall 216. In the rotated position P3, the support brace 234 is inclined obliquely to the longitudinal axis B-B' and the carriage 230 is in the portrait orientation. The support brace 234 may be located at an angle AN2 relative to the longitudinal axis B-B'. The angle AN2 may be chosen such that the carriage 230 can be in the portrait orientation. Further, the support brace 234 extends at least partly through the opening 220 of the top slot wall 216. When moving from the extended position P2 to the rotated position P3, as shown by an arrow A5, the outboard trunnion 228 travels up the ramp 224 and through the opening 220 of the top slot wall 216 to allow the support brace 234 to be inclined obliquely relative to the longitudinal axis B-B' and the carriage 230 to be rotated from the landscape orientation to the portrait orientation. The portrait orientation may further enhance the field of view of the surroundings as compared to the landscape orientation. The carriage 230 can also be rotated from the rotated position P3 back to the extended position P2, and then translated inboard to the home position P1.

The support assembly 202 further includes a plurality of detents disposed on at least one of the top slot wall 216 and the bottom slot wall 218. In the illustrated example, the support arm 206 includes a first detent D1, a second detent D2 and a third detent D3 disposed on the bottom slot wall 218. The first, second and third detents D1, D2, D3 are disposed at predetermined positions along the bottom slot wall 218 and interface with the inboard and/or outboard trunnions 226, 228 to retain the inboard and/or outboard trunnions 226, 228 in predetermined locations based on the home position P1, the extended position P2, and the rotated position P3. Each of the first, second and third detents D1, D2, D3 may be bumps or projections extending from the bottom slot wall 218. The first, second and third detents D1, D2, D3 may temporarily restrict the inboard and/or the outboard trunnions 226, 228 for translation along the slot 222 of the support arm 206. The shape and dimensions of the first, second and third detents D1, D2, D3 may be selected in order to temporarily retain the inboard and/or outboard trunnions 226, 228 at predetermined locations, but allow movement of the inboard and/or outboard trunnions 226, 228 upon actuation of the support brace 234.

The first detent D1 corresponds to the home position P1 of the inboard trunnion 226. The first detent D1 is located proximal to the inboard end 212 of the support arm 206. The first detent D1 may engage and retain the inboard trunnion 226 in the home position P1. Further, the inboard trunnion 226 can travel over the first detent D1 upon actuation of the support brace 234 away from the inboard end 212 of the support arm 206.

The second detent D2 corresponds to the extended position P2 of the inboard trunnion 226. The second detent D2 is located between the ramp 224 and the inboard end 212. The second detent D2 may engage and retain the inboard trunnion 226 in the extended position P2. Further, the inboard trunnion 226 can travel over the second detent D2 upon actuation of the support brace 234 towards the rotated position P3.

The third detent D3 corresponds to the rotated position P3 of the inboard trunnion 226. The third detent D3 is located proximal to the ramp 224. The third detent D3 may engage and retain the inboard trunnion 226 in the rotated position P3. The third detent D3 may also engage and retain the outboard trunnion 228 in the extended position P2. In FIG. 2A, the trunnion (shown in dashed lines) that engages with the third detent D3 is indicated as both 226 and 228 since the inboard trunnion 226 engages the third detent D3 in the rotated position P3, while the outboard trunnion 228 engages the third detent D3 in the extended position P2.

It will be understood to a person skilled in the art that the carriage 230 can assume any number of positions between the home position P1 and the rotated position P3. Detents may be provided corresponding to all the positions of the carriage 230 between the home position P1 and the rotated position P3.

Before the carriage 230 is rotated from the landscape orientation to the portrait orientation, the support brace 234 is at least partly enclosed by the upper arm cover 240 of the support arm 206. The upper arm cover 240 is adapted to at least partly enclose the support arm 206 and the support brace 234. The upper arm cover 240 may extend between the opening of the base cover 210 and the opening 220 of the top slot wall 216 of the support arm 206. The upper arm cover 240 is pivoted at the inboard end 212 of the support arm 206. In an example, the upper arm cover 240 includes a biasing element (not shown) to provide a biasing force such that the upper arm cover 240 remains substantially parallel to the longitudinal axis B-B' of the support arm 206. In an example, the biasing element can be a spring-loaded mechanism. In another example, the upper arm cover 240 may be connected to a slot (not shown) provided on the support brace 234. The slot may retain the upper arm cover 240 such that the upper arm cover 240 can pivot along with the support brace 234 from the home position P1 to the rotated position P3. The upper arm cover 240 is disposed substantially parallel to the longitudinal axis B-B' of the support arm 206 from the home position P1 to the extended position P2. When the carriage 230 is shifted from the extended position P2 to the rotated position P3, the support brace 234 extends through the opening 220 from its longitudinal position under the pivoted upper arm cover 240 such that the upper arm cover 240 is partly inclined with respect to the longitudinal axis B-B'. The upper arm cover 240 may support the support brace 234 when the support brace 234 is inclined obliquely relative to the longitudinal axis B-B' of the support arm 206.

The upper arm cover 240 may cover the opening 220 in the top slot wall 216. This may reduce ingress of any external elements or contaminants through the opening 220. In an example, a sealing member (not shown) may be utilized to seal the opening 220 to further prevent ingress of contaminants. The sealing member may include a gasket, a shroud, or the like. The sealing member may be part of the upper arm cover 240 or the support arm 206.

The top slot wall 216 of the support arm 206 further includes a top curved portion 242 disposed proximal to the outboard end 214 of the support arm 206. The bottom slot wall 218 of the support arm 206 further includes a bottom curved portion 244 disposed proximal to the outboard end 214 of the support arm 206. The top curved portion 242 and the bottom curved portion 244 together define a curved portion 250 of the slot 222 therebetween. The top slot wall 216 further includes a top vertical portion 246 disposed adjacent to the top curved portion 242 and substantially perpendicular to the longitudinal axis B-B' of the support arm 206. The bottom slot wall 218 further includes a bottom vertical portion 248 disposed adjacent to the bottom curved portion 244 and substantially perpendicular to the longitudinal axis B-B' of the support arm 206. The top vertical portion 246 and the bottom vertical portion 248 at least partly define a vertical portion 252 of the slot 222 therebetween. The slot 222 may be substantially parallel to the longitudinal axis B-B' in a horizontal portion extending from the inboard end 212. Further, the slot 222 may be substantially perpendicular to the longitudinal axis B-B' in the vertical portion 252 disposed proximal to the outboard end 214. The curved position 250 may act as a transition region between horizontal position and the vertical portion 252.

The support assembly 202 further includes an end trunnion 254 at least partly and movably received in the slot 222. The end trunnion 254 may rotate and/or slide with respect to the slot 222. The end trunnion 254 is disposed outboard of the ramp 224 and the opening 220 of the top slot wall 216 of the support arm 206. The end trunnion 254 is coupled to the carriage 230. The end trunnion 254 may be rotatably coupled to the carriage 230. Specifically, the carriage 230 can rotate relative to the end trunnion 254. However, the end trunnion 254 translates with the carriage 230. As the carriage 230 is rotated from the landscape orientation to the portrait orientation along with the mirror head as shown by an arrow A6, the end trunnion 254 moves through the curved portion 250 of the slot 222 as shown by an arrow A7 and is received in the vertical portion 252 of the slot 222. This may retain the carriage 230 in the rotated position P3 when the support brace 234 is inclined obliquely relative to the longitudinal axis B-B' of the support arm 206. In this position, the upper arm cover 240 may enhance the locking of the carriage 230 by providing support to the support brace 234. Suitable dimensions and geometry of the vertical portion 252 and the curved portion 250 of the slot 222 may be defined to allow smooth and easy transition of the end trunnion 254 between the rotated position P3 and the home position P1.

The support arm 206 further includes a side slot wall 256 (FIG. 2B) extending between the top slot wall 216 and the bottom slot wall 218. The top slot wall 216, the bottom slot wall 218, and the side slot wall 256 together define the slot 222 therebetween. The side slot wall 256 may restrict a lateral movement of the inboard, outboard and end trunnions 226, 228, 254 within the slot 222. In the illustrated example, the support arm 206 includes a pair of side slot walls 256.

Figure 3:
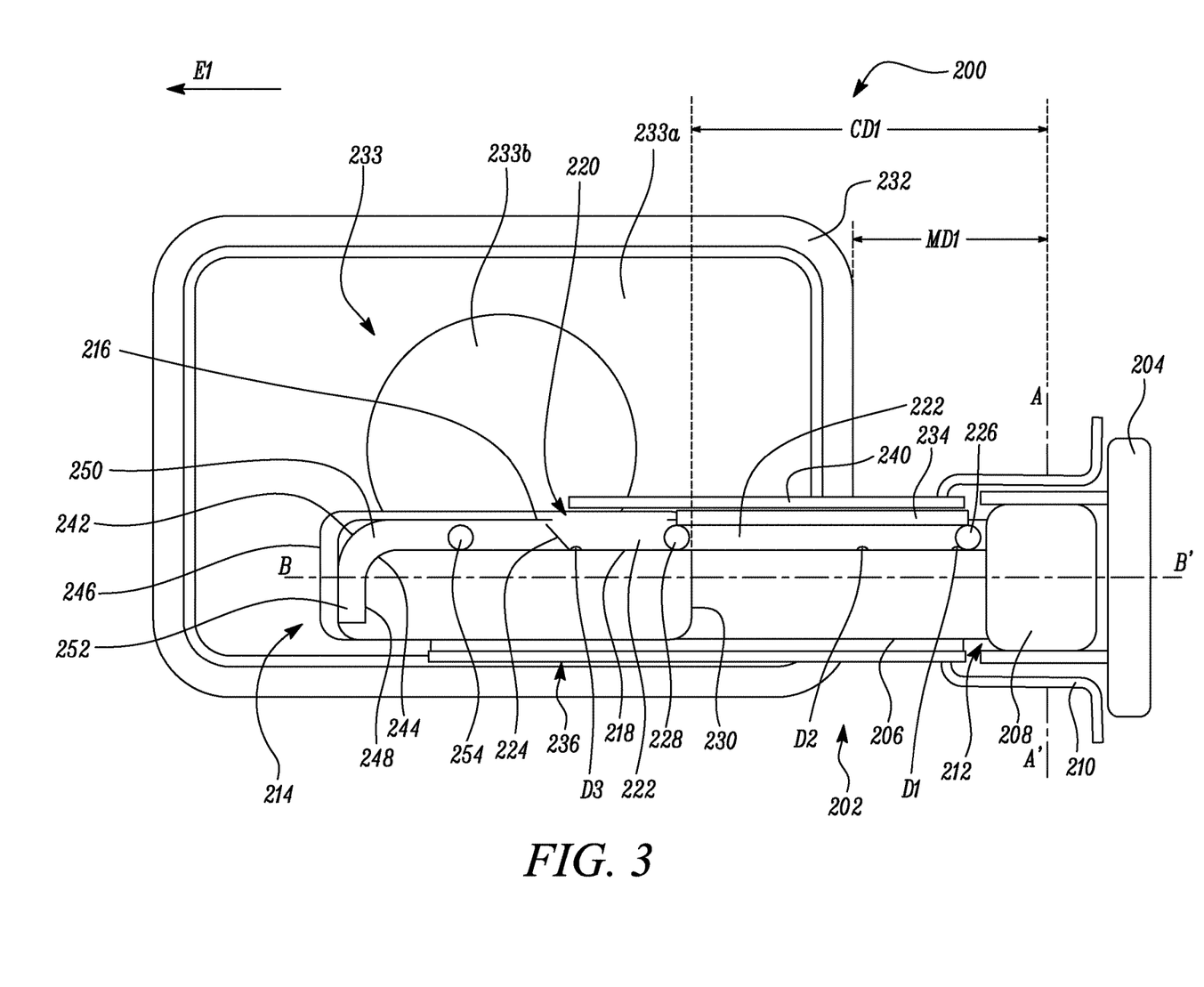
FIG. 3 illustrates a schematic side view of the mirror system of FIG. 2A in a home position.

FIG. 3 illustrates another aspect of the mirror system 200. In the illustrated example, the mirror system 200 is coupled to a vehicle. The mirror system 200 further includes a mirror head 232 fixedly coupled to the carriage 230. The mirror head 232 may be fixedly coupled to the carriage 230 by various methods, such as fasteners, adhesives, mechanical joints, welding, or a combination thereof. In the illustrated example, the mirror head 232 has a substantially rectangular shape with rounded edges. However, in other examples, the mirror head 232 may have any suitable shape, such as circular, elliptical, oval, polygonal, etc. The mirror head 232 includes a reflective element 233 disposed within a frame. The reflective element 233 includes a primary reflective element 233a and a secondary reflective element 233b. The primary reflective element 233a may be substantially planar. The secondary reflective element 233b may be non-planar, for example, a convex mirror. In an example, the secondary reflective element 233b acts as a blind spot mirror and may allow the mirror head 232 to reflect objects from a wider range of angles than is possible with the primary reflective element 233a. In an example, the primary reflective element 233a and the secondary reflective element 233b can be configured in the mirror head 232 according to design constraints. The mirror system 200 may also be provided with enhanced functionality, such as an automatic dimming reflective element, a reflective element defogging/defrosting element, turn indicators, area lights, powered extension, power folding, and the like.

The outboard trunnion 228 selectively travels on the ramp 224 and through the opening 220 of the top slot wall 216 to allow the support brace 234 to be inclined obliquely relative to the longitudinal axis B-B' of the support arm 206. This may allow the carriage 230 along with the mirror head 232 to be rotated from the landscape to the portrait orientation. The mirror system 200 may allow a driver of the vehicle to adjust the field of view to wider range of angles as and when required. As the carriage 230 along with the mirror head 232 is moved from the landscape orientation to the portrait orientation, the end trunnion 254 moves through the curved portion 250 of the slot 222 and is received in the vertical portion 252 of the slot 222. This may releasably lock the mirror head 232 in the portrait orientation when the support brace 234 is inclined obliquely relative to the longitudinal axis B-B' of the support arm 206.

Referring again to FIG. 3, the mirror head 232 is illustrated in the home position P1. In the home position P1, the mirror head 232 along with the carriage 230 is in the landscape orientation. An inboard edge of the mirror head 232 is located at a distance MD1 from the rotational axis A-A'. Further, an inboard edge of the carriage 230 is located at a distance CD1 from the rotational axis A-A'. The mirror head 232 can be selectively displaced along the longitudinal axis B-B' of the support arm 206. For example, the mirror head 232 may be manually moved from the home position P1 along the longitudinal axis B-B'. The carriage 230 may also move along with the mirror head 232 from the home position P1. The mirror head 232 can be selectively moved between the extended position P2 (shown in FIG. 4) and the rotated position P3 (shown in FIG. 5). The mirror head 232 can be moved to the extended position P2 from the home position P1 by translating the mirror head 232 along the longitudinal axis B-B', as indicated by an arrow E1. In the home position P1, the inboard trunnion 226 and the outboard trunnion 228 are disposed inboard of the ramp 224 and the opening 220 of the top slot wall 216. The support brace 234 is disposed substantially parallel to the longitudinal axis B-B' and proximal to the inboard end 212 of the support arm 206. The end trunnion 254 is disposed outboard the ramp 224 and proximal to the outboard end 214 of the support arm 206.

Figure 4:
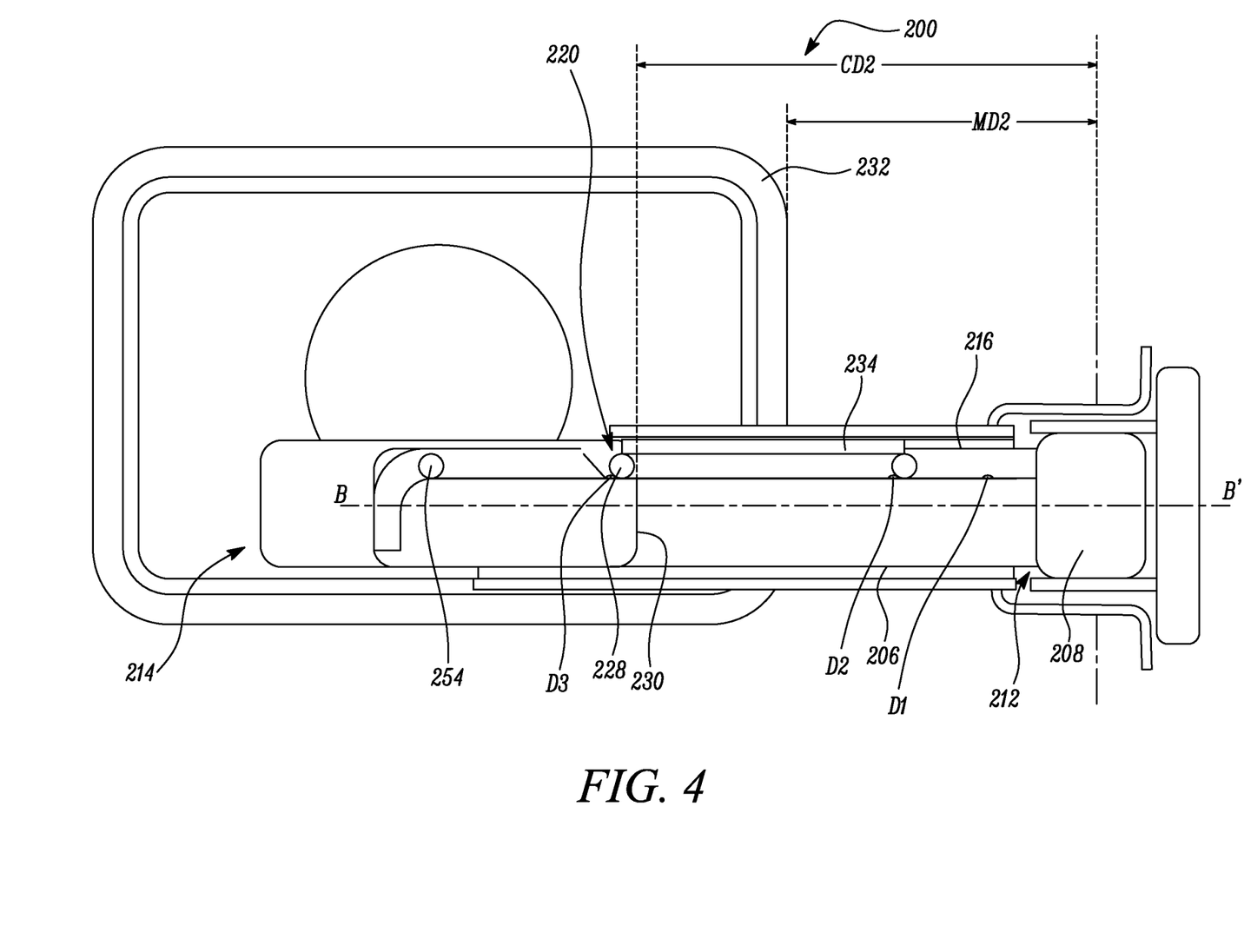
FIG. 4 illustrates a schematic side view of the mirror system of FIG. 2A in an extended position.

FIG. 4 illustrates the mirror system 200 in the extended position P2. Referring to FIGS. 3 and 4, the mirror head 232 reaches the extended position P2 from the home position P1 by translating along the mirror head 232 along the longitudinal axis B-B'. In the extended position P1, the inboard trunnion 226 is disposed inboard of the ramp 224 and the opening 220 of the top slot wall 216. The outboard trunnion 228 is disposed proximal to the ramp 224. The support brace 234 is disposed substantially parallel to the longitudinal axis B-B' of the support arm 206 and spaced apart from the inboard end 212 of the support arm 206. The carriage 230 along with the mirror head 232 are in the landscape orientation. The end trunnion 254 is disposed outboard the ramp 224 and proximal to the outboard end 214 of the support arm 206. In the extended position P2, the inboard edge of the mirror head 232 is located at a distance MD2 from the rotational axis A-A'. Further, the inboard edge of the carriage 230 is located at a distance CD2 from the rotational axis A-A'. The distance MD2 is greater than the distance MD1 shown in FIG. 3. Similarly, the distance CD2 is greater than the distance CD1 shown in FIG. 3.

Figure 5:
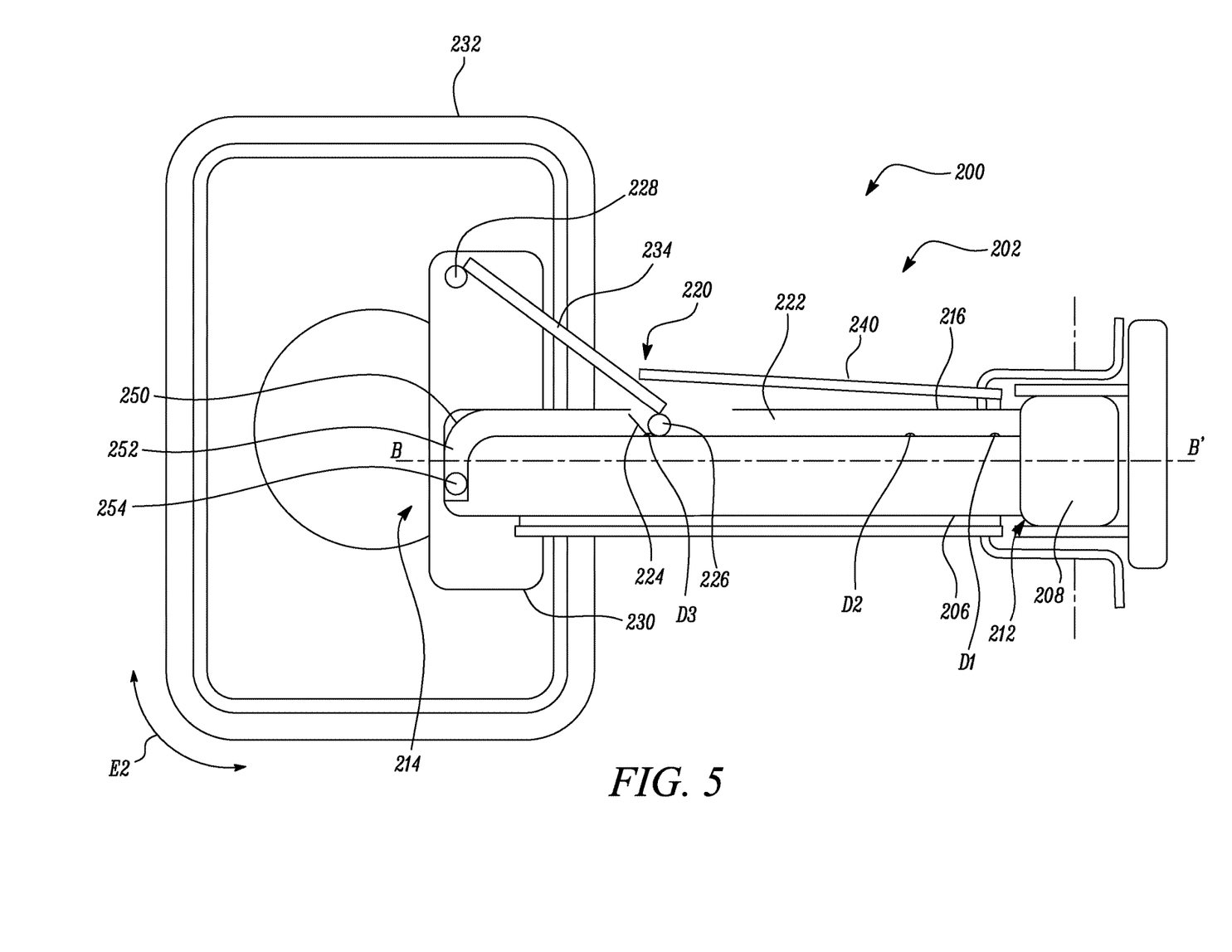
FIG. 5 illustrates a schematic side view of the mirror system of FIG. 2A in a rotated position.

FIG. 5 illustrates the mirror system 200 in the rotated position P3. Referring to FIGS. 3, 4 and 5, the mirror head 232 reaches the rotated position P3 from the extended position P2 by rotating about its own axis as shown by an arrow E2. In an example, the support assembly 202 allows rotation of the mirror head 232 only from the extended position P2. The support brace 234 may not allow rotation of the carriage 230 and the mirror head 232 while the outboard trunnion 228 is received in the slot 222. The support brace 234 may be disposed substantially parallel to the longitudinal axis B-B' when both the inboard and outboard trunnions 226, 228 are disposed in the slot 222. Any rotation of the support brace 234 relative to the longitudinal axis B-B' may be prevented as long as both the inboard and outboard trunnions 226, 228 are disposed in the slot 222. In the rotated position, the inboard trunnion 226 is disposed proximal to the ramp 224 of the support arm 206. The outboard trunnion 228 is disposed outside the slot 222 and the opening 220 of the top slot wall 216 of the support arm 206. When moving from the extended position P2 to the rotated position P3, the outboard trunnion 228 travels up the ramp 224 and through the opening 220 of the top slot wall 216 to allow the support brace 234 to be inclined obliquely relative to the longitudinal axis B-B' of the support arm 206 such that the carriage 230 and the mirror head 232 are rotated from their respective landscape orientations of the extended position P2 to their respective portrait orientations of the rotated position P3. As the mirror head 232 is rotated from the landscape orientation to the portrait orientation, the end trunnion 254 moves through the curved portion 250 of the slot 222 and is received in the vertical portion 252 of the slot 222. This may retain the carriage 230 and the mirror head 232 in the rotated position P3 when the support brace 234 is inclined obliquely relative to the longitudinal axis B-B' of the support arm 206. The portrait orientation of the mirror head 232 may further enhance the field of view behind the vehicle. The upper arm cover 240 is pivotable and spring-biased to allow the support brace 234 to be inclined obliquely relative to the longitudinal axis B-B' of the support arm 206. The upper arm cover 240 rests against the support brace 234 in the portrait orientation of the mirror head 232. This may further enhance the locking of the mirror head 232 in the rotated position P3.

The mirror head 232 may be manually moved from the home position P1 to the extended position P2. The mirror head 232 may be manually moved from the extended position P2 to the rotated position P3. Further, the mirror head 232 may be manually moved from the rotated position P3 to the extended position P2, and then to the home position P1. During movement from the rotated position P3 to the extended position P2, the carriage 230 and the mirror head 232 are rotated from their respective portrait orientations to their respective landscape orientations. Further, the support brace 234 is moved from its oblique position and disposed substantially parallel to the longitudinal axis B-B'. The outboard trunnion 228 moves through the opening 220, down the ramp 224 and into the slot 222. The inboard trunnion 226 moves away inboard from the ramp 224. Both the inboard and outboard trunnions 226, 228 are therefore disposed in the slot 222 to allow the support brace 234 to be disposed substantially parallel to the longitudinal axis B-B', and the carriage 230 and the mirror head 232 to be positioned in their respective landscape orientations. The mirror head 232 may be manually moved from the extended position P2 to the home position P1. The inboard and outboard trunnions 226, 228 are displaced along the slot 222, and allow the support brace 234, the carriage 230 and the mirror head 232 to be moved along the longitudinal axis B-B' to the home position P1.

Figures 6A, 6B:
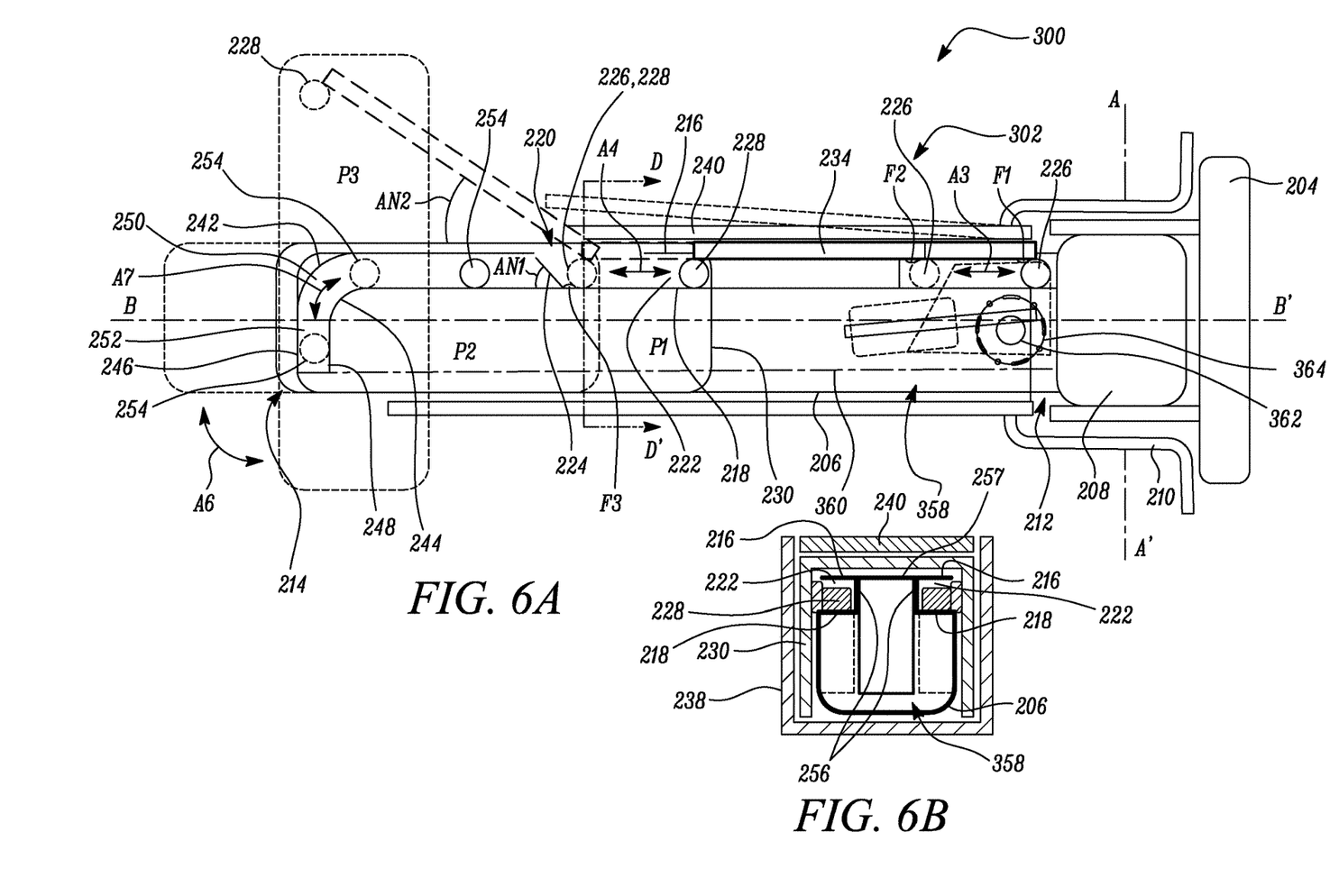
FIG. 6A illustrates a schematic side view of another example of a mirror system.
FIG. 6B illustrates a schematic sectional view of the mirror system taken along a line D-D' in FIG. 6A.

FIG. 6A illustrates another example of a mirror system 300. The mirror system 300 is substantially similar in structure and operation to the mirror system 200 described above with reference to FIGS. 2A-2C, and 3-5. However, the mirror system 300 is electrically powered instead of being actuated manually. The mirror system 300 includes a support assembly 302 substantially similar to the support assembly 202. In the illustrated example, the support assembly 302 includes a motor drive 358 disposed between the inboard end 212 and the outboard end 214 of the support arm 206. The motor drive 358 is adapted to selectively drive the carriage 230 along the longitudinal axis B-B'. In some alternative examples, the motor drive 358 may selectively drive the inboard trunnion 226 along the longitudinal axis B-B' of the support arm 206. The motor drive 358 may be actuated based on a user input. Alternatively or additionally, the motor drive 358 may be actuated automatically based on a predetermined algorithm.

Referring to FIGS. 6A and 6B, the motor drive 358 includes an electric motor 362 drivably coupled to a clutch assembly 364. The clutch assembly 364 may include a drive gear that meshes with a gear track 360. The support arm 206 includes the gear track 360 disposed between the pair of slots 222. The gear track 360 may engage with the carriage 230 or the inboard trunnion 226 such that the carriage 230 can be moved between the home position P1, the extended position P2 and the rotated position P3. The clutch assembly 364 may be an overrunning clutch that allows unidirectional transfer of power from the electric motor 362 to the drive gear. This may isolate the motor drive 358 from the gear track 360 in case of manual actuation of the mirror head 232 or any movement of the mirror head 232 due to external impacts. The motor drive 358 may be powered by a battery or any other suitable energy source.

Further, as shown in FIG. 6A, the mirror system 300 includes first, second and third detents F1, F2, F3. The first and second detents F1, F2 are disposed on the top slot wall 216 instead of the bottom slot wall 218. Positions of the first and second detents F1, F2 with respect to the longitudinal axis B-B' may be substantially similar to the positions of the respective first and second detents D1, D2 of the mirror system 200 (shown in FIG. 2A). The third detent F3 is similar to the third detent D3 of the mirror system 200 (shown in FIG. 2A). Specifically, the third detent is disposed on bottom slot wall 218.

It should be understood that the above described motor drive 358 is merely illustrative of a suitable drive that may be used for powering the mirror system 300. It will be understood that any other suitable type of drives can be used for supplying power, such as belt pulley drives, geared drives, hydraulic drives, pneumatic drives, variable speed drives, eddy-current drives, and the like.

Each of the mirror systems 200 and 300 described above provides a three-position mirror system that allows the mirror head 232 to be moved between three different positions to adjust a field of view around a vehicle. Each of the support assemblies 202, 302 may enable stable movement of the mirror head 232 between the three positions. The support brace 234 may allow rotation of the mirror head 232 between the landscape orientation to the portrait orientation without adversely affecting a natural frequency of the mirror head 232, and hence the mirror systems 200, 300. Each of the mirror systems 200, 300 may be have a simple and lightweight design. Further, the mirror systems 200, 300 may be suitable for use with relatively smaller vehicles, such as pick-up trucks.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

Furthermore, the features of the disclosure disclosed in this specification, the claims and the drawings may be employed both individually and in any possible combination for practicing the disclosure in its various exemplary embodiments. In particular, all claim feature combinations, irrespective of the claim dependencies, are covered with this application.

LIST OF NUMBERS

100 Mirror System
102 Support Assembly
103 Body
104 Base Frame
106 Mirror Head
108 Mirror Frame
110 Reflective Element
110a Primary Reflective Element
110b Secondary Reflective Element
P1 Home Position
P2 Extended Position
P3 Rotated Position
200 Mirror System
202 Support Assembly
204 Base Frame
206 Support Arm
208 Pivot Mechanism
210 Base Cover
212 Inboard End
214 Outboard End
216 Top Slot Wall
218 Bottom Slot Wall
220 Opening
222 Slot
224 Ramp
226 Inboard Trunnion
228 Outboard Trunnion
230 Carriage
234 Support Brace
238 Lower Arm Cover 240 Upper Arm Cover
242 Top Curved Portion
244 Bottom Curved Portion
246 Top Vertical Portion
248 Bottom Vertical Portion
250 Curved Portion
252 Vertical Portion
254 End Trunnion
256 Side Slot Wall
257 Connecting Wall
DT1 Distance
DT2 Distance
MD1 Distance
MD2 Distance
CD1 Distance
CD2 Distance
D1 First Detent
D2 Second Detent
D3 Third Detent
232 Mirror Head
233 Reflective Element
233a Primary Reflective Element
233b Secondary Reflective Element
300 Mirror System
302 Support Assembly
358 Motor Drive
360 Gear Track
362 Electric Motor
364 Clutch Assembly
F1 First Detent
F2 Second Detent
F3 Third Detent
X-X' Rotational Axis
A-A' Rotational Axis
B-B' Longitudinal Axis
AN1 Angle
AN2 Angle
A1 Arrow
A2 Arrow
A3 Arrow
A4 Arrow
A5 Arrow
A6 Arrow
A7 Arrow
E1 Arrow
E2 Arrow

The invention claimed is:

1. A support assembly for a mirror head, comprising:
a support arm defining an inboard end, an outboard end opposite to the inboard end, and a longitudinal axis extending between the inboard end and the outboard end, the support arm including:
a top slot wall extending at least partly along the longitudinal axis, wherein the top slot wall defines an opening therethrough between the inboard end and the outboard end;
a bottom slot wall disposed opposite to the top slot wall and extending at least partly along the longitudinal axis, wherein the top slot wall and the bottom slot wall at least partly define a slot therebetween; and
a ramp extending from the bottom slot wall towards the top slot wall adjacent to the opening, wherein the ramp is inclined obliquely relative to the longitudinal axis;
an inboard trunnion adapted to be at least partly and movably received in the slot;
an outboard trunnion adapted to be at least partly and movably received in the slot;
a carriage coupled to the outboard trunnion and the mirror head, wherein the carriage is selectively rotatable; and
a support brace rotationally coupled to the inboard trunnion and the outboard trunnion such that the support brace is rotatable relative to the inboard trunnion and the outboard trunnion;
wherein the outboard trunnion selectively travels on the ramp and through the opening to allow the support brace to be inclined obliquely relative to the longitudinal axis and the carriage to be rotated.

2. The support assembly of claim 1, wherein the carriage is selectively rotatable between a landscape orientation and a portrait orientation, wherein, in the landscape orientation, the carriage is orientated substantially parallel to the longitudinal axis, and wherein, in the portrait orientation, the carriage is orientated substantially perpendicular to the longitudinal axis.

3. The support assembly of claim 2, wherein in a home position:
the inboard trunnion is at least partly received in the slot and disposed inboard of the ramp and the opening;
the outboard trunnion is at least partly received in the slot and disposed inboard of the ramp and the opening;
the support brace is disposed substantially parallel to the longitudinal axis and proximal to the inboard end of the support arm; and
the carriage is in the landscape orientation.

4. The support assembly of claim 3, wherein in an extended position:
the inboard trunnion is at least partly received in the slot and disposed inboard of the ramp and the opening;
the outboard trunnion is at least partly received in the slot and disposed proximal to the ramp;
the support brace is disposed substantially parallel to the longitudinal axis and spaced apart from the inboard end of the support arm, wherein a distance between the support brace and the inboard end in the extended position is greater than a distance between the support brace and the inboard end in the home position; and
the carriage is in the landscape orientation.

5. The support assembly of claim 2, wherein in a rotated position:
the inboard trunnion is at least partly received in the slot and disposed proximal to the ramp;
the outboard trunnion is disposed outside the slot and outboard of the ramp and the opening;
the support brace is inclined obliquely to the longitudinal axis; and
the carriage is in the portrait orientation.

6. The support assembly of claim 5, wherein the top slot wall further includes a top curved portion disposed proximal to the outboard end, wherein the bottom slot wall further includes a bottom curved portion disposed proximal to the outboard end, the top curved portion and the bottom curved portion at least partly defining a curved portion of the slot therebetween.

7. The support assembly of claim 6, wherein the top slot wall further includes a top vertical portion disposed adjacent to the top curved portion and substantially perpendicular to the longitudinal axis, wherein the bottom slot wall further includes a bottom vertical portion disposed adjacent to the bottom curved portion and substantially perpendicular to the longitudinal axis, the top vertical portion and the bottom vertical portion at least partly defining a vertical portion of the slot therebetween.

8. The support assembly of claim 7, further comprising an end trunnion at least partly and movably received in the slot and disposed outboard of the ramp and the opening, the end trunnion being coupled to the carriage, wherein, in the rotated position, the end trunnion is at least partly received in the vertical portion of the slot.

9. The support assembly of claim 1, further comprising an upper arm cover adapted to at least partly enclose the support arm and the support brace, wherein the upper arm cover is pivotable and spring-biased to allow the support brace to be inclined obliquely relative to the longitudinal axis.

10. The support assembly of claim 9, further comprising a lower arm cover at least partly enclosing the support arm.

11. The support assembly of claim 1, further comprising a plurality of detents disposed on at least one of the top slot wall and the bottom slot wall.

12. The support assembly of claim 1, further comprising a side slot wall extending between the top slot wall and the bottom slot wall, wherein the top slot wall, the bottom slot wall and the side slot wall together define the slot therebetween.

13. The support assembly of claim 1, further comprising a base frame and a pivot mechanism coupled to the base frame, wherein the support arm is coupled to the pivot mechanism.

14. The support assembly of claim 1, further comprising a motor drive adapted to selectively drive the carriage along the longitudinal axis.

15. A mirror system for a vehicle, comprising:
a base frame coupled to the vehicle;
a pivot mechanism coupled to the base frame;
a support assembly including:
a support arm coupled to the pivot mechanism and defining an inboard end, an outboard end opposite to the inboard end, and a longitudinal axis extending between the inboard end and the outboard end, the support arm including:
a top slot wall extending at least partly along the longitudinal axis, wherein the top slot wall defines an opening therethrough between the inboard end and the outboard end;
a bottom slot wall disposed opposite to the top slot wall and extending at least partly along the longitudinal axis, wherein the top slot wall and the bottom slot wall at least partly define a slot therebetween; and
a ramp extending from the bottom slot wall towards the top slot wall adjacent to the opening, wherein the ramp is inclined obliquely relative to the longitudinal axis;
an inboard trunnion adapted to be at least partly and movably received in the slot;
an outboard trunnion adapted to be at least partly and movably received in the slot;
a carriage coupled to the outboard trunnion, the carriage being selectively rotatable between a landscape orientation and a portrait orientation, wherein, in the landscape orientation, the carriage is orientated substantially parallel to the longitudinal axis, and wherein, in the portrait orientation, the carriage is orientated substantially perpendicular to the longitudinal axis; and
a support brace rotationally coupled to the inboard trunnion and the outboard trunnion such that the support brace is rotatable relative to the inboard trunnion and the outboard trunnion; and
a mirror head fixedly coupled to the carriage;
wherein the outboard trunnion selectively travels on the ramp and through the opening to allow the support brace to be inclined obliquely relative to the longitudinal axis and the carriage to be rotated from the landscape to portrait orientation.

16. The mirror system of claim 15, wherein in a home position:
the inboard trunnion is at least partly received in the slot and disposed inboard of the ramp and the opening;
the outboard trunnion is at least partly received in the slot and disposed inboard of the ramp and the opening;
the support brace is disposed substantially parallel to the longitudinal axis and proximal to the inboard end of the support arm; and
the carriage is in the landscape orientation.

17. The mirror system of claim 16, wherein in an extended position:
the inboard trunnion is at least partly received in the slot and disposed inboard of the ramp and the opening;
the outboard trunnion is at least partly received in the slot and disposed proximal to the ramp;
the support brace is disposed substantially parallel to the longitudinal axis and spaced apart from the inboard end of the support arm, wherein a distance between the support brace and the inboard end in the extended position is greater than a distance between the support brace and the inboard end in the home position; and
the carriage is in the landscape orientation.

18. The mirror system of claim 15, wherein in a rotated position:
the inboard trunnion is at least partly received in the slot and disposed proximal to the ramp;
the outboard trunnion is disposed outside the slot and outboard of the ramp and the opening;
the support brace is inclined obliquely to the longitudinal axis; and
the carriage is in the portrait orientation.

19. The mirror system of claim 15, further comprising an end trunnion at least partly and movably received in the slot and disposed outboard of the ramp and the opening, the end trunnion being coupled to the carriage.

20. The mirror system of claim 15, further comprising a plurality of detents disposed on at least one of the top slot wall and the bottom slot wall.

* * * * *